(12) United States Patent
Etchegoyen

(10) Patent No.: US 9,047,450 B2
(45) Date of Patent: Jun. 2, 2015

(54) IDENTIFICATION OF EMBEDDED SYSTEM DEVICES

(75) Inventor: Craig Stephen Etchegoyen, Irvine, CA (US)

(73) Assignee: DeviceAuthority, Inc., Fremont, CA (US)

(*) Notice: Subject to any disclaimer, the term of this patent is extended or adjusted under 35 U.S.C. 154(b) by 133 days.

(21) Appl. No.: 12/813,424

(22) Filed: Jun. 10, 2010

(65) Prior Publication Data

US 2010/0325704 A1  Dec. 23, 2010

Related U.S. Application Data

(60) Provisional application No. 61/218,605, filed on Jun. 19, 2009.

(51) Int. Cl.
  *G06F 15/16* (2006.01)
  *G06F 21/31* (2013.01)
  *G06F 21/73* (2013.01)

(52) U.S. Cl.
  CPC .............. *G06F 21/31* (2013.01); *G06F 21/73* (2013.01); *G06F 2221/2129* (2013.01)

(58) Field of Classification Search
  USPC .................... 726/3, 5, 16–19; 709/227–229; 711/170, E12.002
  See application file for complete search history.

(56) References Cited

U.S. PATENT DOCUMENTS

| 4,246,638 A | 1/1981 | Thomas |
| 4,351,982 A | 9/1982 | Miller et al. |
| 4,658,093 A | 4/1987 | Hellman |
| 4,704,610 A | 11/1987 | Smith et al. |
| 4,779,224 A | 10/1988 | Moseley et al. |
| 4,796,220 A | 1/1989 | Wolfe |
| 4,891,503 A | 1/1990 | Jewell |
| 5,210,795 A | 5/1993 | Lipner et al. |
| 5,235,642 A | 8/1993 | Wobber et al. |
| 5,239,166 A | 8/1993 | Graves |
| 5,241,594 A | 8/1993 | Kung |
| 5,291,598 A | 3/1994 | Grundy |

(Continued)

FOREIGN PATENT DOCUMENTS

| AU | 678985 | 6/1997 |
| EP | 1637958 | 3/2006 |

(Continued)

OTHER PUBLICATIONS

NIKON; Nikon Coolpix S52/S52c User's Manual; Apr. 21, 2008.*

(Continued)

*Primary Examiner* — Mohammad A Siddiqi
(74) *Attorney, Agent, or Firm* — Ramirez & Smith

(57) ABSTRACT

An embedded system device comprises a processor operatively coupled to a first memory space, a second memory space, and a plurality of user controls. The processor is configured to execute only executable code residing within the first memory space, and the executable code includes authentication routine configured to generate a device identifier based at least upon non-user-configurable parameters of the embedded system device. The second memory space includes user configurable options for use by the processor when executing the executable code. The user controls are adapted to configure the user configurable options within the second memory space, wherein the user controls cannot configure the first memory space.

5 Claims, 4 Drawing Sheets

(56) References Cited

U.S. PATENT DOCUMENTS

| | | |
|---|---|---|
| 5,414,269 A | 5/1995 | Takahashi |
| 5,418,854 A | 5/1995 | Kaufman et al. |
| 5,440,635 A | 8/1995 | Bellovin et al. |
| 5,490,216 A | 2/1996 | Richardson, III |
| 5,666,415 A | 9/1997 | Kaufman |
| 5,745,879 A | 4/1998 | Wyman |
| 5,754,763 A | 5/1998 | Bereiter |
| 5,790,664 A | 8/1998 | Coley et al. |
| 5,925,127 A | 7/1999 | Ahmad |
| 5,974,150 A | 10/1999 | Kaish et al. |
| 6,009,401 A | 12/1999 | Horstmann |
| 6,041,411 A | 3/2000 | Wyatt |
| 6,044,471 A | 3/2000 | Colvin |
| 6,158,005 A | 12/2000 | Bharathan et al. |
| 6,230,199 B1 | 5/2001 | Revashetti et al. |
| 6,233,567 B1 | 5/2001 | Cohen |
| 6,243,468 B1 | 6/2001 | Pearce et al. |
| 6,294,793 B1 | 9/2001 | Brunfeld et al. |
| 6,330,608 B1 | 12/2001 | Stiles |
| 6,330,670 B1 | 12/2001 | England et al. |
| 6,418,472 B1* | 7/2002 | Mi et al. .................. 709/229 |
| 6,449,645 B1 | 9/2002 | Nash |
| 6,536,005 B1 | 3/2003 | Augarten |
| 6,785,825 B2 | 8/2004 | Colvin |
| 6,826,690 B1 | 11/2004 | Hind et al. |
| 6,859,793 B1 | 2/2005 | Lambiase |
| 6,920,567 B1 | 7/2005 | Doherty et al. |
| 6,976,009 B2 | 12/2005 | Tadayon et al. |
| 7,032,110 B1 | 4/2006 | Su et al. |
| 7,069,440 B2 | 6/2006 | Aull |
| 7,069,595 B2 | 6/2006 | Cognigni et al. |
| 7,082,535 B1 | 7/2006 | Norman et al. |
| 7,085,741 B2 | 8/2006 | Lao et al. |
| 7,100,195 B1 | 8/2006 | Underwood |
| 7,178,025 B2 | 2/2007 | Scheidt et al. |
| 7,188,241 B2 | 3/2007 | Cronce et al. |
| 7,203,966 B2 | 4/2007 | Abburi et al. |
| 7,206,765 B2 | 4/2007 | Gilliam et al. |
| 7,272,728 B2 | 9/2007 | Pierson et al. |
| 7,305,562 B1 | 12/2007 | Bianco et al. |
| 7,310,813 B2 | 12/2007 | Lin et al. |
| 7,319,987 B1 | 1/2008 | Hoffman et al. |
| 7,327,280 B2 | 2/2008 | Bachelder et al. |
| 7,337,147 B2 | 2/2008 | Chen et al. |
| 7,343,297 B2 | 3/2008 | Bergler et al. |
| 7,418,665 B2* | 8/2008 | Savage ..................... 715/763 |
| 7,463,945 B2 | 12/2008 | Kiesel et al. |
| 7,653,899 B1 | 1/2010 | Lindahl et al. |
| 7,836,121 B2 | 11/2010 | Elgressy et al. |
| 8,171,287 B2 | 5/2012 | Villela |
| 8,327,448 B2* | 12/2012 | Eldar et al. .................. 726/26 |
| 2001/0034712 A1 | 10/2001 | Colvin |
| 2001/0044782 A1 | 11/2001 | Hughes et al. |
| 2002/0019814 A1 | 2/2002 | Ganesan |
| 2002/0065097 A1 | 5/2002 | Brockenbrough et al. |
| 2002/0082997 A1 | 6/2002 | Kobata et al. |
| 2002/0091937 A1 | 7/2002 | Ortiz |
| 2002/0161718 A1 | 10/2002 | Coley et al. |
| 2003/0065918 A1 | 4/2003 | Willey |
| 2003/0097331 A1 | 5/2003 | Cohen |
| 2003/0156719 A1 | 8/2003 | Cronce et al. |
| 2003/0172035 A1 | 9/2003 | Cronce et al. |
| 2003/0182428 A1 | 9/2003 | Li et al. |
| 2004/0024860 A1 | 2/2004 | Sato et al. |
| 2004/0030912 A1 | 2/2004 | Merkle, Jr. et al. |
| 2004/0049685 A1 | 3/2004 | Jaloveczki |
| 2004/0059929 A1 | 3/2004 | Rodgers et al. |
| 2004/0107360 A1 | 6/2004 | Herrmann et al. |
| 2004/0117321 A1 | 6/2004 | Sancho |
| 2004/0143746 A1 | 7/2004 | Ligeti et al. |
| 2004/0148601 A1 | 7/2004 | Kroening |
| 2004/0172531 A1 | 9/2004 | Little et al. |
| 2004/0172558 A1 | 9/2004 | Callahan et al. |
| 2004/0177255 A1 | 9/2004 | Hughes |
| 2004/0187018 A1 | 9/2004 | Owen et al. |
| 2005/0034115 A1 | 2/2005 | Carter et al. |
| 2005/0108173 A1 | 5/2005 | Stefik et al. |
| 2005/0138155 A1 | 6/2005 | Lewis |
| 2005/0166263 A1 | 7/2005 | Nanopoulos et al. |
| 2005/0172280 A1 | 8/2005 | Ziegler et al. |
| 2005/0213768 A1* | 9/2005 | Durham et al. .................. 380/278 |
| 2005/0265446 A1 | 11/2005 | Elgressy et al. |
| 2005/0268087 A1 | 12/2005 | Yasuda et al. |
| 2005/0278542 A1* | 12/2005 | Pierson et al. .................. 713/182 |
| 2006/0005237 A1 | 1/2006 | Kobata et al. |
| 2006/0036766 A1 | 2/2006 | Baupin et al. |
| 2006/0064756 A1 | 3/2006 | Ebert |
| 2006/0072444 A1 | 4/2006 | Engel et al. |
| 2006/0080534 A1 | 4/2006 | Yeap et al. |
| 2006/0085310 A1 | 4/2006 | Mylet et al. |
| 2006/0090070 A1 | 4/2006 | Bade et al. |
| 2006/0095454 A1 | 5/2006 | Shankar et al. |
| 2006/0161914 A1 | 7/2006 | Morrison et al. |
| 2006/0168580 A1 | 7/2006 | Harada et al. |
| 2006/0265337 A1 | 11/2006 | Wesinger, Jr. |
| 2006/0265446 A1 | 11/2006 | Elgressy et al. |
| 2006/0282511 A1 | 12/2006 | Takano et al. |
| 2007/0061566 A1 | 3/2007 | Bailey et al. |
| 2007/0078785 A1 | 4/2007 | Bush et al. |
| 2007/0113090 A1 | 5/2007 | Villela |
| 2007/0124689 A1 | 5/2007 | Weksel |
| 2007/0143408 A1 | 6/2007 | Daigle |
| 2007/0143838 A1* | 6/2007 | Milligan et al. .................. 726/15 |
| 2007/0168288 A1 | 7/2007 | Bozeman |
| 2007/0174633 A1 | 7/2007 | Draper et al. |
| 2007/0198422 A1 | 8/2007 | Prahlad et al. |
| 2007/0203846 A1 | 8/2007 | Kavuri et al. |
| 2007/0207780 A1 | 9/2007 | McLean |
| 2007/0209064 A1 | 9/2007 | Qin et al. |
| 2007/0219917 A1 | 9/2007 | Liu et al. |
| 2007/0260883 A1 | 11/2007 | Giobbi et al. |
| 2007/0282615 A1 | 12/2007 | Hamilton et al. |
| 2008/0052775 A1 | 2/2008 | Sandhu et al. |
| 2008/0065552 A1 | 3/2008 | Elazar et al. |
| 2008/0086423 A1 | 4/2008 | Waites |
| 2008/0097924 A1* | 4/2008 | Carper et al. .................. 705/65 |
| 2008/0104683 A1 | 5/2008 | Nagami et al. |
| 2008/0120195 A1 | 5/2008 | Shakkarwar |
| 2008/0120707 A1* | 5/2008 | Ramia .................. 726/5 |
| 2008/0147556 A1 | 6/2008 | Smith et al. |
| 2008/0152140 A1 | 6/2008 | Fascenda |
| 2008/0177997 A1 | 7/2008 | Morais et al. |
| 2008/0228578 A1 | 9/2008 | Mashinsky |
| 2008/0242405 A1 | 10/2008 | Chen et al. |
| 2008/0261562 A1 | 10/2008 | Jwa et al. |
| 2008/0268815 A1 | 10/2008 | Jazra et al. |
| 2008/0289025 A1 | 11/2008 | Schneider |
| 2008/0320607 A1 | 12/2008 | Richardson |
| 2009/0019536 A1 | 1/2009 | Green et al. |
| 2009/0083730 A1 | 3/2009 | Richardson |
| 2009/0083833 A1 | 3/2009 | Ziola et al. |
| 2009/0113088 A1 | 4/2009 | Illowsky et al. |
| 2009/0119744 A1* | 5/2009 | Lange et al. .................. 726/1 |
| 2009/0132813 A1 | 5/2009 | Schibuk |
| 2009/0138643 A1* | 5/2009 | Charles et al. .................. 710/301 |
| 2009/0138975 A1 | 5/2009 | Richardson |
| 2009/0158396 A1* | 6/2009 | Baum et al. .................. 726/4 |
| 2003/0125975 A1 | 7/2012 | Ortiz |

FOREIGN PATENT DOCUMENTS

| | | |
|---|---|---|
| EP | 1637961 | 3/2006 |
| EP | 1670188 | 6/2006 |
| EP | 2312483 | 4/2011 |
| EP | 2323062 | 5/2011 |
| GB | 2355322 | 4/2001 |
| GB | 2434724 | 8/2007 |
| WO | WO 92/09160 | 5/1992 |
| WO | WO 9220022 | 11/1992 |
| WO | WO 9301550 | 1/1993 |
| WO | WO 9535533 | 12/1995 |
| WO | WO 00/58895 | 10/2000 |
| WO | WO 0067095 | 11/2000 |
| WO | WO 01/90892 | 11/2001 |

(56) References Cited

FOREIGN PATENT DOCUMENTS

| | | |
|---|---|---|
| WO | WO 03/032126 | 4/2003 |
| WO | WO 2004/054196 | 6/2004 |
| WO | WO 2005104686 | 11/2005 |
| WO | WO2007060516 | 5/2007 |
| WO | WO2008013504 | 1/2008 |
| WO | WO 2008/127431 | 10/2008 |
| WO | WO2008157639 | 12/2008 |
| WO | WO2009039504 | 3/2009 |
| WO | WO2009065135 | 5/2009 |
| WO | WO2009076232 | 6/2009 |
| WO | WO2009105702 | 8/2009 |
| WO | WO2009143115 | 11/2009 |
| WO | WO2009158525 | 12/2009 |
| WO | WO 2011/032605 | 3/2011 |

OTHER PUBLICATIONS

Jasen et al.; Assigning and Enforcing Security Policies on handheld devices; Journal Article; 2000, pp. 1-8.*

Housley et al., "Internet x.509 Public Key Infracstructure Certificate and CRL Profile," *The Internet Society*, Network Working Group, 1999, 75 pages [RFC 2459].

Muncaster et al., "Continous Multimodal Authentication Using Dynamic Baysian Networks," Second Workshop on Multimodal User Authentication, Toulouse, France, May 11-12, 2006. XP55003041.

Sim et al. "Continous Verification Using Multimodal Biometrics", *IEEE Transactions on Pattern Analysis and Machine Intelligence*, vol. 29, No. 4, Apr. 1, 2007, IEEE Service Center, Los Alamitos, CA, pp. 687-700. XP011168507.

Williams, R., "A Painless Guide to CRC Error Detection Algorithms", Ver. 3, Aug. 19, 1993.

Angha, F. et al., "Securing Transportation Network Infrastructure with Patented Technology of Device Locking—Developed by Uniloc USA", *avail. at*: http://www.dksassociates.com/admin/paperfile/ITS%20World%20Paper%20Submission_Uniloc%20_2_.pdf, Oct. 24, 2006.

Econolite, "Econolite and Uniloc Partner to Bring Unmatched Infrastructure Security to Advanced Traffic Control Networks with Launch of Strongpoint", *avail. at*: http://www.econolite.com/docs/press/20080304_Econolite_StrongPoint.pdf, Mar. 4, 2008.

Johnson et al. "Dynamic Source Routing in Ad Hoc Wireless Networks," *Mobile Computing*, Kluwer Academic Publishers, 1996.

David J-L, "Cookieless Data Persistence in Possible," Apr. 23, 2003, Internet Article retrieved on Sep. 21, 2010. XP002603490.

Iovation, "Using Reputation of Devices to Detect and Prevent Online Retail Fraud," *White Paper*, Apr. 2007.

Iovation, "Controlling High Fraud Risk of International Transactions," *Iovation Reputation Services, White Paper*, May 2007.

Posting from Slashdot on the article "Smart Cards for Windows XP Login" Comment "Re: PIN" posted Dec. 3, 2001. http://en.wikipedia.org/w/index.php?title=Two-factor_authentication&ildid=216794321.

* cited by examiner

IDENTIFICATION OF EMBEDDED SYSTEM DEVICES

This application claims priority to U.S. Provisional Application No. 61/218,605 which was filed Jun. 19, 2009 and which is fully incorporated herein by reference.

BACKGROUND

1. Field of the Invention

The field of the present invention relates to embedded system devices, and more particularly the digital fingerprinting of embedded system devices.

2. Description of the Related Art

Embedded system devices are becoming more and more prevalent in everyday life. Examples of such devices include traffic signals, traffic cameras, digital cameras, digital video cameras, telephones, cellular phones, televisions, vehicles, vehicle navigation systems, and wireless routers, to name just a very few. Embedded system devices generally are designed to perform one, or just a few, dedicated functions, and perform them using a combination of hardware and software that is optimized for task. Such optimization often allows embedded system devices to be smaller, more cost efficient, more power efficient, and more reliable. With the explosion of embedded system devices in society, they are also increasingly being network enabled so that they can communicate, whether wired or wirelessly, with other devices and with designated servers. Given the connectedness of embedded system devices, it is becoming increasingly important to both authenticate the devices themselves at the outset of communications, and in some instances, to establish secure communications with the devices. Serial numbers, Media Access Control (MAC) addresses, and other forms of assigned identifiers can be limiting and are easily spoofed.

SUMMARY OF THE INVENTION

The present invention is directed toward the identification of embedded system devices. Identification is achieved by having the embedded system self-generate a device identifier based at least upon non-user-configurable parameters.

In a first separate aspect of the present invention, an embedded system device comprises a processor operatively coupled to a first memory space, a second memory space, and a plurality of user controls. The processor is configured to execute only executable code residing within the first memory space, and the executable code includes authentication routine configured to generate the device identifier. The second memory space includes user configurable options for use by the processor when executing the executable code. The user controls are adapted to configure the user configurable options within the second memory space, but the user controls cannot configure the first memory space.

In a second aspect of the present invention, building upon the first separate aspect, the device may further comprise a communication port, also operatively connected to the processor. Through the communication port, the first memory space may be accessed and altered. Further, the authentication routine may utilize the communication port to establish a communication link with a server and transmit the device identifier to the server.

In a third aspect of the present invention, also building upon the first separate aspect, the non-user-configurable parameters may include any one or more of the following: information about the device hardware; information about the executable code; information derived from the device hardware; and information derived from the executable code.

In a fourth separate aspect of the present invention, a system for authenticating an embedded system device comprises an authentication server with which the embedded system device communicates. In response to a communication link being available between the authentication server and the embedded system device, the authentication server is configured to first receive from the embedded system device an authentication request, which includes an assigned device identifier and a generated device identifier. Both identifiers identify the embedded system device, and the generated device identifier is based upon non-user-configurable parameters of the embedded system device. The server then accesses a database including records of known assigned device identifiers and known generated device identifiers. With both the authentication request and the database records available, the server compares the two data sources to authenticate the embedded system device.

In a fifth separate aspect of the present invention, building upon the fourth separate aspect, the embedded system device is configured to send the authentication request upon the communication link being established.

In a sixth separate aspect of the present invention, building upon the fourth separate aspect, the server may follow authentication of the embedded system device by establishing a secure communication link with the embedded system device.

In a seventh separate aspect of the present invention, any of the foregoing aspects may be employed in combination.

Accordingly, improved identification of embedded system devices is disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
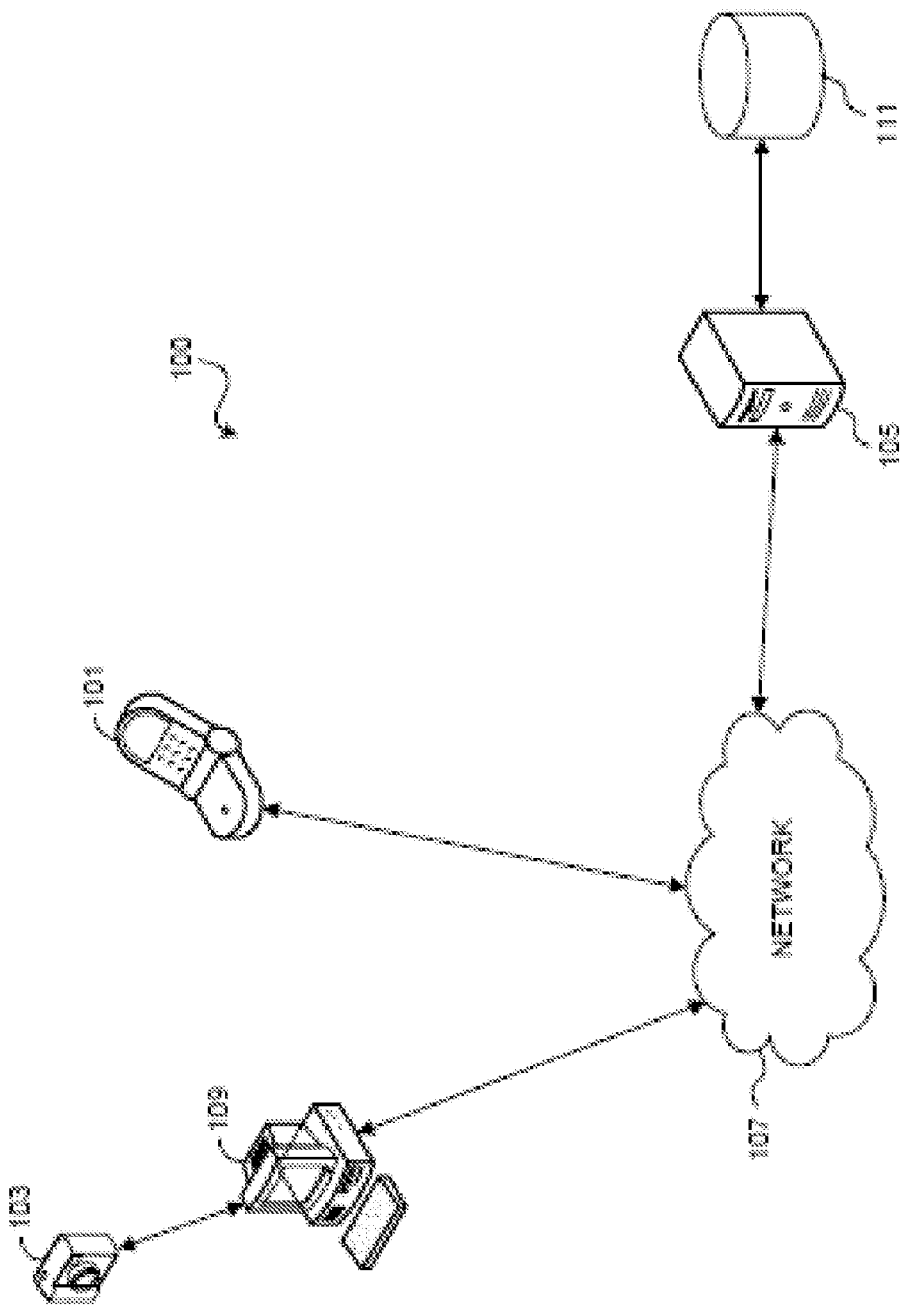
FIG. 1 is a conceptual diagram illustrating a system according to the invention for authenticating an embedded system device.

Turning in detail to the drawings, FIG. 1 illustrates a system 100 which is arranged to enable authentication of embedded system devices 101, 103, upon request from each respective device 101, 103, through communications with the authentication server 105 over the network 107. Any additional number of embedded system devices may connect to the authentication server 105 via the network 107, which enables bidirectional communications between any such embedded system devices and the authentication server 105. The first embedded system device 101 communicates with the server 105 via a direct connection with the network 107. In comparison, the second embedded system device 103 communicates with the server 105 indirectly through the computer 109, which is itself communicably connected to the network 107. Any number of intermediary devices, whether a computer or otherwise, may be used to interconnect an embedded system device to the network 107, and thus to the authentication server 105. Further, in circumstances where the embedded system device is network enabled, such intermediary devices may be considered part of the network 107 themselves. In instances where the embedded system device is not directly network enabled, the embedded system device may utilize the network connection of the intermediary device.

The communication links between the network 107, on the one hand, and the embedded system devices 101, 103 and the authentication server 105, on the other hand, may take any form desired. For example, any of the communication links may be established through intermediaries such as a private communications network or over a public communications network, the Internet being an example of the latter. Alternatively, a private communications network, a public communications network, or any combination of one or more of such networks may form the network 107. Also, any of the communication links may be established directly or indirectly, permanent or transitory, wired and/or wireless. In some instances, the communication links may be established as needed.

With respect to the first embedded system device 101, during the authentication process, which is described in greater detail below, a communication link is established between the embedded system device 101 and the server 105. Either the embedded system device 101 or the server 105 may initiate the communication link as necessary or desired. After the communication link is established, the embedded system device 101 sends an authentication request to the server 105, and the server uses the records stored within the database 111 to provide authentication. The database 111 may reside on the server 105, or it may reside on another computing device that is communicatively connected with the server 105, as desired. The database 111 includes records of known embedded system devices, including at least the device identifier and the associated assigned identification for each known device. Other information, such as user, location, manufacturer, and the like may also be stored within the database and associated with the records for each embedded system device. Further, the database may be constructed from known embedded system devices as they are produced by a manufacturer, but before they are sold, or it may be constructed by adding data to the database from embedded system devices as authentication requests are received from devices that have already been placed into use. The database 111 thus serves as a master record for known embedded system devices, from which the server 105 draws information during the authentication process. Once authentication has been achieved, other communications may occur between the embedded system device 101 and the server 105, or between the embedded system device 101 and any other similarly authenticated device or system, with assurances that the authenticated devices and/or systems are not being spoofed or otherwise being falsely represented.

Hereinafter, any embedded system device, including the embedded system devices 101, 103 shown, will be referred to simply as a "device", with the understanding that they may be any machine or device capable of communication with a computer network, either directly or indirectly, such as a game console, a personal digital assistant, a mobile phone, a wireless communication device, an onboard vehicle computer, a camera, a GPS system, and the like. Embedded system devices are less than computers that are fully programmable by the user. Such devices may be fully programmable, but not using the controls through which the user operates the device. For example, the user controls on a digital camera may allow the user to control the functionality and operation of the camera, but they do not permit the user to modify the underlying executable code that makes the camera function as a camera. The executable code, if it is alterable, may be accessed through a communication port, such as a Universal Serial Bus (USB) port, and then only after manufacturer codes are supplied to the camera's processor, thereby opening up the memory space holding the executable code to modification.

Figure 2:
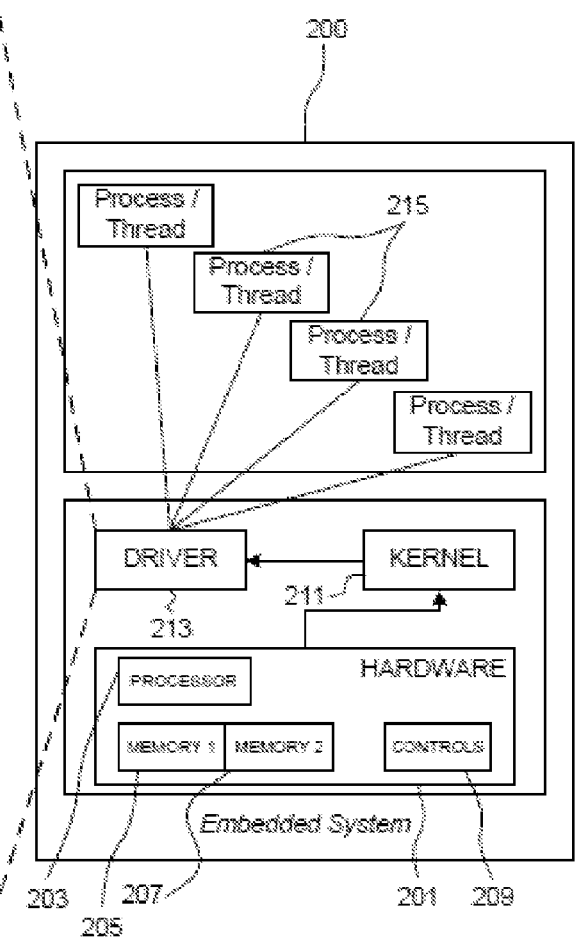
FIG. 2 is a block diagram illustrating an embedded system device.

Other devices may operate in the same manner as the aforementioned digital camera, but with different controls and/or different types of communication ports. Such embedded devices are well-known in the relevant arts, and as such are only described in overview herein. The common technological similarities between all such embedded system devices include user controls that, under normal operating conditions, give the user no access to the executable code that provides functionality to the hardware of the device. FIG. 2 illustrates an example of an embedded system device 200. The device is formed from hardware 201 that is appropriate for the functionality of the device 200. The hardware 201 includes at least the operatively connected components of a processor 203, a first memory space 205, a second memory space 207, and user controls 209. The first and second memory spaces 205, 207 may be formed from a single memory module that is partitioned or functions to separate to otherwise distinguish the two memory spaces 205, 207. The first memory space 205 is reserved for the executable code that gives the embedded system device its functionality in combination with the rest of the hardware 201. The executable code may include an embedded general operating system or kernel, such as Linux, an optimized or specially crafted kernel, driver processes, libraries as needed for the specific hardware that is incorporated into the device, and any other executable code appropriate for the functioning of the hardware. The processor 203 executes the kernel 211, and the kernel 211 serves to control other executable code, such as drivers 213 and other processes and/or threads 215, and through that code, the hardware 201 of the device 200.

The second memory space 207 is reserved for storing user configurable options which are used by the processor 203 when executing the executable code stored within the first memory space 205. These user configurable options are selected by the user controls 209 and may enhance the functionality of the device 200 and its specific hardware components. The user controls 209, however, are limited to selection of the user configurable options, and cannot be used to modify the executable code stored within the first memory space 205. The user controls 209 may include any of buttons, scroll wheels, touch screens, sliders, switches, and the like as desired and/or needed for the device 200 to perform its desired function(s).

An authentication routine is one of the specific processes that is stored as executable code within the first memory space 205. The authentication routine may be called as needed or as desired. For example, the kernel 211 may be configured to call the authentication routine when a network connection is first obtained, regardless of whether the network connection is directly established or indirectly established through an intermediary device. As another example, the kernel 211 may be configured to call the authentication routine when prompted over an already established network connection.

The authentication routine assembles data from the hardware and/or the executable code stored within the first memory space 205 to generate a device identifier that forms part of the authentication request sent to the authentication server over an established communication link. The authentication request also preferably includes an assigned identifier for the device, with the device identifier, when generated in the manner described below, to serve as a verification on the assigned identifier. Any other desired information about the device may be included as part of the authentication request. Once the device identifier is generated, it is sent as part of the authentication request to the authentication server.

The authentication routine includes a device identifier subroutine that collects information regarding the embedded system device by checking a number of parameters which, collectively, are expected to uniquely identify the embedded system device. The description below presumes that the software includes a routine which generates the device identifier. The parameters checked may include, for example, hard disk volume name, user name, device name, user password, hard disk initialization date, etc. The collected information includes information that identifies the hardware of the device, such as, for example, CPU number, or unique parameters associated with the firmware in use. The system information may further include system configuration information, such as amount of memory, type of processor, software or operating system serial number, etc.

Based on the collected information, the routine generates a device identifier that uniquely identifies the embedded system device. The device identifier may be stored in memory included within of the device, and/or it may be generated each time authentication is required. The device identifier is generated by a process which operates on data indicative of the embedded system device's configuration and hardware.

The device identifier is generated using non-user-configurable machine parameters as input to a process that results in the device identifier, which may be expressed in digital data as a binary number. Each machine parameter is data determined by a hardware component, software component, or data component specific to the device that the unique identifier pertains to. This data may be invariable and/or variable. Machine parameters may be selected based on the embedded system device configuration such that the resulting device identifier has a very high probability (e.g., greater than 99.999%) of being unique to the embedded system device. In addition, the machine parameters may be selected such that the device identifier includes at least a stable unique portion up to and including the entire identifier, that has a very high probability of remaining unchanged during normal operation of the embedded system device. Thus, the resulting device identifier should be highly specific, unique, reproducible and stable as a result of properly selecting the machine parameters.

The identifier subroutine that generates the device identifier may also operate on the collected parameters with one or more algorithms to generate the device identifier. This process may include at least one irreversible transformation, such as, for example, a cryptographic hash function, such that the input machine parameters cannot be derived from the resulting device identifier. Each device identifier, to a very high degree of certainty, cannot be generated except by the suitably configured device identifier routine operating or otherwise having had access to the same embedded system device for which the device identifier was first generated. Conversely, each identifier, again to a very high degree of certainty, can be successfully reproduced by the suitably configured device identifier routine operating or otherwise having access to the same embedded system device on which the identifier was first generated.

The identifier subroutine may operate by performing a system scan to determine a present configuration of the embedded system device. The routine may then select the machine parameters to be used as input for generating the unique device identifier. Selection of parameters may vary depending on the system configuration. Once the parameters are selected, the routine may generate the identifier. Alternatively, for purposes of optimization, the machine parameters may be selected in advance, with the selection being preprogrammed into the identifier subroutine.

Further, generating the device identifier may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identifier may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identifier values during transmission and comparisons. Such encryption processes may be used in conjunction with random sampling and key generations.

The device identifier may be generated by utilizing machine parameters associated with one or more of the following: machine model; machine serial number; machine copyright; machine ROM version; machine bus speed; machine details; machine manufacturer; machine ROM release date; machine ROM size; machine UUID; and machine service tag.

The device identifier may also be generated by utilizing machine parameters associated with one or more of the following: CPU ID; CPU model; CPU details; CPU actual speed; CPU family; CPU manufacturer; CPU voltage; and CPU external clock.

The device identifier may also be generated by utilizing machine parameters associated with one or more of the following: memory model; memory slots; memory total; and memory details.

The device identifier may also be generated by utilizing machine parameters associated with one or more of the following: video model; video details; display model; display details; audio model; and audio details.

The device identifier may also be generated by utilizing machine parameters associated with one or more of the following: network model; network address; Bluetooth address; BlackBox model; BlackBox serial; BlackBox details; BlackBox damage map; BlackBox volume name; NetStore details; and NetStore volume name.

The device identifier may also be generated by utilizing machine parameters associated with one or more of the following: optical model; optical serial; optical details; and the types and serial numbers of user controls that are incorporated into the device.

The device identifier may also be generated by utilizing machine parameters associated with one or more of the following: baseboard manufacturer; baseboard product name; baseboard version; baseboard serial number; and baseboard asset tag.

The device identifier may also be generated by utilizing machine parameters associated with one or more of the following: chassis manufacturer; chassis type; chassis version; and chassis serial number.

The device identifier may also be generated by utilizing machine parameters associated with one or more of the following: IDE controller; SATA controller; RAID controller; and SCSI controller.

The device identifier may also be generated by utilizing machine parameters associated with one or more of the following: port connector designator; port connector type; port connector port type; and system slot type.

The device identifier may also be generated by utilizing machine parameters associated with one or more of the following: cache level; cache size; cache max size; cache SRAM type; and cache error correction type.

The device identifier may also be generated by utilizing machine parameters associated with one or more of the following: fan; PCMCIA; modem; portable battery; tape drive; USB controller; and USB hub.

The device identifier may also be generated by utilizing machine parameters associated with one or more of the following: device model; device model IMEI; device model IMSI; and device model LCD.

The device identifier may also be generated by utilizing machine parameters associated with one or more of the following: wireless 802.11; camera; silicone serial; and PCI controller.

In one example, the device identifier may also be generated by utilizing machine parameters associated with one or more of the following: machine model, processor model, processor details, processor speed, memory model, memory total, network model of each Ethernet interface, network MAC address of each Ethernet interface, BlackBox Model, BlackBox Serial (e.g., using Dallas Silicone Serial DS-2401 chipset or the like), OS install date, nonce value, and nonce time of day.

The device identifier may also be generated by utilizing machine parameters associated with one or more of the following: numbers of process threads; assigned ID's of process threads, kernel information; driver information; the size of any and/or all embedded software and/or software threads.

Figure 3:
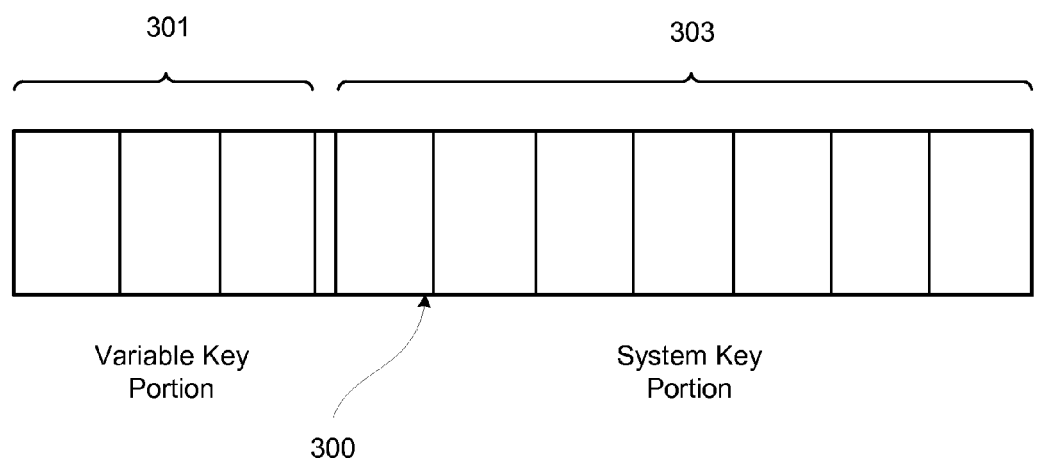
FIG. 3 is a block diagram of memory allocation for a device identifier generated according to the invention for use in identifying an embedded system device.

The device identifier may also be generated by utilizing information about and/or signatures derived from the executable code, or any portion thereof, that is stored within the first memory space. FIG. 3 shows an example of driver information 217 that is stored as part of the executable code for an embedded system device. Many of the drivers listed here are standard Linux drivers. The name, size, and any other particulars about the drivers stored and used by the device may be incorporated as part of the device identifier. A signature for the executable code, or any portion thereof, may be generated in any number of ways, including through the use of commonly used hash functions, checksum functions, software fingerprint functions, and the like. Such functions, along with methods of implementing such functions to produce software signatures (also sometimes referred to as "fingerprints"), are well known to those of skill in the relevant arts, and as such are not discussed in further detail herein.

In addition to the above identified possibilities for parameters, the device identifier may be generated by utilizing any machine parameter, including embedded software, or parts thereof, that is identifiable and quantifiable.

FIG. 3 illustrates an exemplary embodiment of a device identifier 300, which may include two components—namely, a variable key portion 301 and a system key portion 303. The variable key portion 301 may be generated by reference to a variable platform parameter, such as via reference to system time information, although other parameters which are variable may be utilized in other embodiments. The system key portion 303 may include the above described parameters that are expected to be unique to the embedded system device and that are present within the device. Examples of such parameters include the machine model, the processor details, the memory total, the device name or assigned identification, the hard disk volume name, the hard disk initialization date, or combinations of any of the parameters described herein, limited only by the type and character of the hardware incorporated into the embedded system device. The variable key portion 301 and/or the system key portion 303 may be combined with the IP address and/or other platform parameters of the embedded system device. The device identifier, or portions thereof, may be encrypted to add an additional layer of specificity and security.

Figure 4:
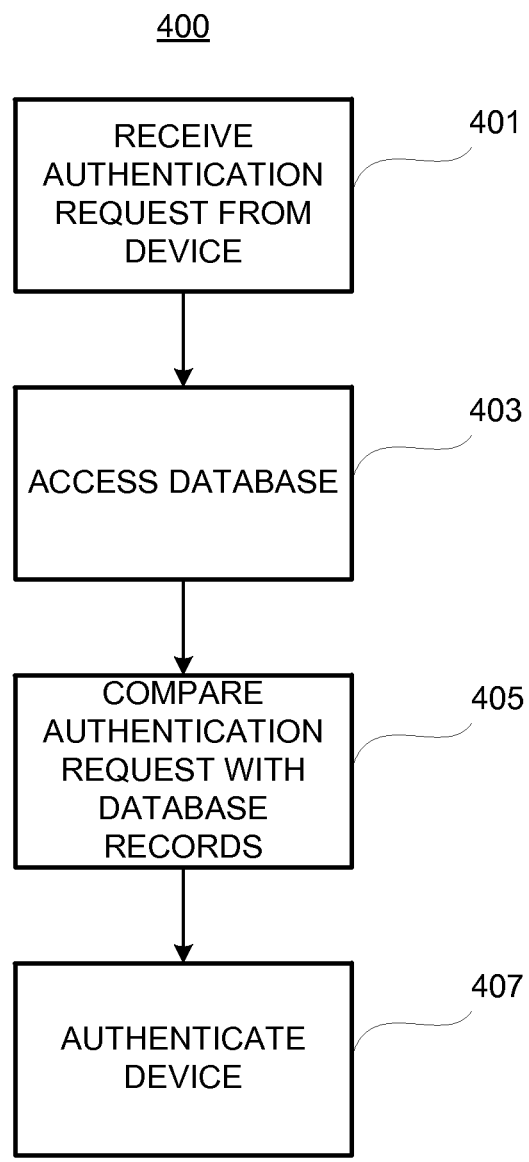
FIG. 4 is a flowchart illustrating a software process for authenticating an embedded system device.

FIG. 4 illustrates the process 400 of the authentication server after receiving 401 an authentication request from an embedded system device. Following receipt 401 of the authentication request, the authentication server accesses 403 the database, which contains records of known embedded system devices, and compares 405 the data contained within the authentication request against the device identifiers, both assigned and generated, that are contained within the database. Assuming that a match is found, the authentication will authenticate 407 the device. Once the device is authenticated, the authentication server may establish a secure communication session with the device through known methods such as by establishing a Secure Private Network (SPN) over the public network. Methods for establishing secure communications are well known in the relevant arts, and thus are not discussed further herein. In addition, once authenticated, the device may be enabled to communicate directly with other authenticated devices or computing devices. Such communications may be in the clear or established using a secure communication session.

Thus, identification of embedded system devices is disclosed. While embodiments of this invention have been shown and described, it will be apparent to those skilled in the art that many more modifications are possible without departing from the inventive concepts herein. The invention, therefore, is not to be restricted except in the spirit of the following claims.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A system for authenticating an embedded system device, the system comprising:
    an authentication server configured so that, in response to a communication link being available between the authentication server and the embedded system device, the authentication server:
    receives from the embedded system device, via the communication link, an authentication request including an assigned device identifier and a generated device identifier, both identifying the embedded system device, wherein the generated device identifier is based upon non-user-configurable parameters of the embedded system device, wherein the non-user-configurable parameters comprise information derived from executable code stored within a first memory of the embedded system device that stores all executable code of the embedded system device and that is separate from a second memory of the embedded system device that stores all user-configurable data of the device;
    accesses a database including records of known assigned device identifiers and known generated device identifiers; and
    authenticates the embedded system device based upon a comparison between the authentication request and the records within the database.

2. The system of claim 1, wherein the authentication server is further configured so that, in response to the communication link being available between the authentication server and the embedded system device, the authentication server establishes a secure communication link with the embedded system device following authentication of the embedded system device.

3. The system of claim 1, wherein the embedded system device is configured to send the authentication request upon the communication link being established.

4. The system of claim 1, wherein the non-user-configurable parameters comprise information about hardware within the embedded system device.

5. The system of claim 1, wherein the non-user-configurable parameters comprise information derived from hardware within the embedded system device.

* * * * *